(12) United States Patent
Feriola et al.

(10) Patent No.: US 9,033,181 B2
(45) Date of Patent: May 19, 2015

(54) COMBINATION BAKING PAN AND COOLING RACK

(71) Applicants: Michael Feriola, Eastport, NY (US); George McConnell Davison, III, Pittsburgh, PA (US); Peter Arthur Meier, Pittsburgh, PA (US); Jason Reed Rogge, Belle Vernon, PA (US); Colin Derek Curry, Allison Park, PA (US); Matthew David McClatchey, Harwick, PA (US)

(72) Inventors: Michael Feriola, Eastport, NY (US); George McConnell Davison, III, Pittsburgh, PA (US); Peter Arthur Meier, Pittsburgh, PA (US); Jason Reed Rogge, Belle Vernon, PA (US); Colin Derek Curry, Allison Park, PA (US); Matthew David McClatchey, Harwick, PA (US)

( * ) Notice: Subject to any disclaimer, the term of this patent is extended or adjusted under 35 U.S.C. 154(b) by 0 days.

(21) Appl. No.: 14/011,812

(22) Filed: Aug. 28, 2013

(65) Prior Publication Data
US 2014/0065278 A1    Mar. 6, 2014

Related U.S. Application Data

(60) Provisional application No. 61/693,926, filed on Aug. 28, 2012.

(51) Int. Cl.
*A47J 37/01*    (2006.01)
*A21D 8/06*    (2006.01)

(52) U.S. Cl.
CPC .. *A47J 37/01* (2013.01); *A21D 8/06* (2013.01)

(58) Field of Classification Search
CPC .......................................................... A47J 37/01
USPC .............. 220/4.26, 4.27, 23.83, 23.87, 573.2, 220/573.4
See application file for complete search history.

(56) References Cited

U.S. PATENT DOCUMENTS 4,677,906 A * 7/1987 Lowe ............................. 99/450

* cited by examiner

*Primary Examiner* — Fenn Mathew
*Assistant Examiner* — Elizabeth Volz
(74) *Attorney, Agent, or Firm* — John F. Vodopia

(57) ABSTRACT

A baking device for baking and cooling baked goods includes a rectangular baking pan formed from a single sheet of metal with planar opposing baking and bottom pan surfaces, including indentations positioned at four corners to extend out as protrusions from the bottom pan surface as standoffs. The baking device also includes a complementary rectangular cooling rack formed from a single sheet of metal with planar opposing baking and bottom rack surfaces, including indentations or depressions formed in the baking rack surface and positioned at four corners to extend out as protrusions from the bottom cooling rack surface and a plurality of small gauge holes. Dimensions of the cooling rack and baking pan are ensure that the cooling rack seats snugly in the baking pan so that the bottom cooling rack surface contacts and presses against the baking pan surface in an assembled state.

14 Claims, 3 Drawing Sheets

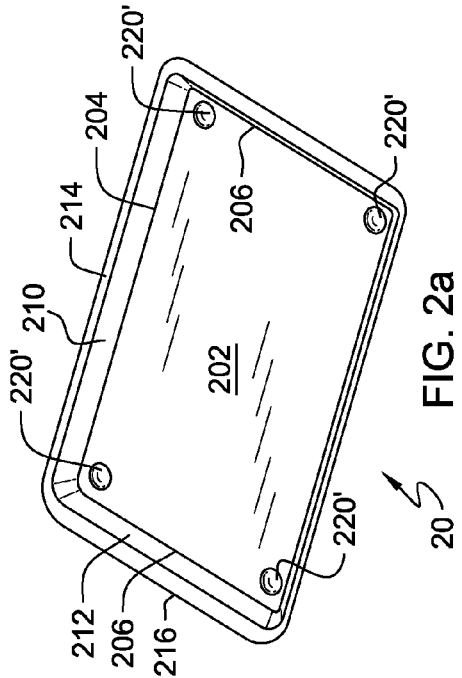
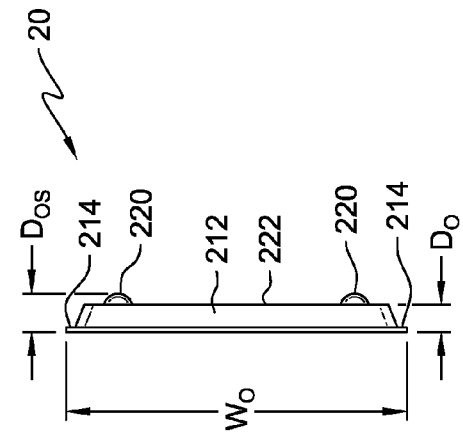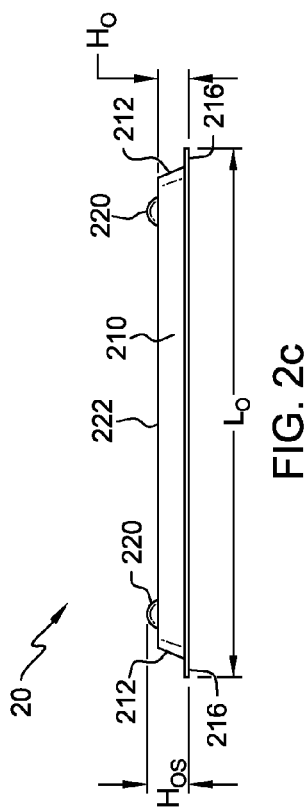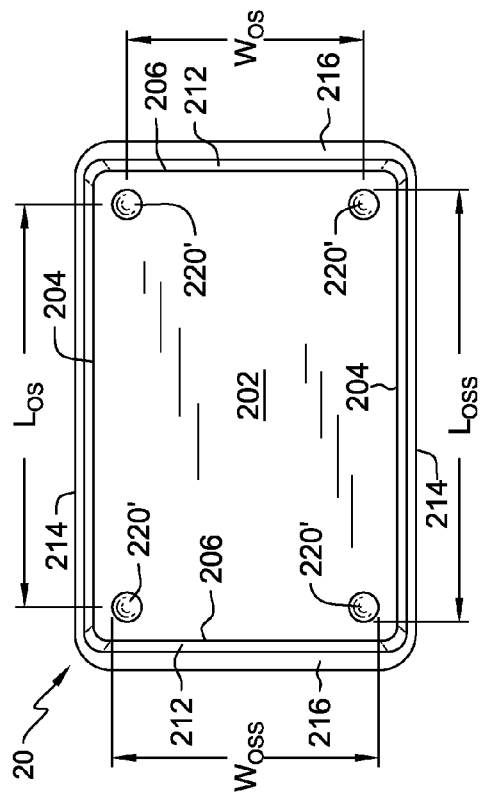

COMBINATION BAKING PAN AND COOLING RACK

CROSS-REFERENCE TO RELATED APPLICATIONS

The invention described and claimed hereinbelow claims priority under 35 USC §120 from U.S. Provisional Patent Application 61/673,926, filed Aug. 28, 2012, the content of which is incorporated by reference herein.

BACKGROUND OF THE INVENTION

The invention relates broadly to a baking pan and, more particularly relates to baking pan and cooling rack in combination.

Baking sheets, baking pans, baking trays (hereinafter "baking pans") and cooling racks used for cooling baked goods ("cooling racks") are known for use in commercial, institutional and home settings. In many cases, baking pans and cooling racks are formed as rigid, planar bodies from ceramic and/or metals. Appropriate metals include black, carbon or stainless steel, aluminum, anodized aluminum, cast iron, titanium, etc. Metal baking pans are generally formed by cutting and stamping sheets of the various metals. Baking pans are available in a variety of sizes, shapes and metal thicknesses and, generally include side edges or lips arising out of a horizontal plane of the sheet, vertically or substantially vertically. Known baking pans also typically include a handle, for example, in the form of one or more extended side panels functioning as a handle.

Leaving baked goods in a hot baking pan or baking sheet after removal from an oven is not recommended as heat from the hot pan or sheet can affect the baked goods (post-baking). For example, heat from the hot pan or sheet continues to "cook" the baked goods for a time after oven removal. Also, steam generated by the oven-heated baked goods inside the hot pan frequently causes the bottom of baked goods to be soggy if left to sit on the pan surface after oven removal. Removing the baked goods to a cooling rack allows the air to circulate, which stops the cooking process and prevents sticky bottoms. A good rule to follow is that, after removing a conventional baking pan from an oven, the baked goods should remain in or on the conventional sheet or pan for no more than ten (10) minutes, otherwise the baked goods will likely stick to the pan surface. And again, to remedy this problem, the heated or cooked baking products (e.g., tollhouse cookies), are physically removed from the conventional baking pan and placed on a conventional cooling rack.

Like baking pans, cooling racks are made from known metals, generally metal wires formed as a frame structure. Cooling racks typically include an upper wire "surface" raised above a base portion of the cooling rack in order to facilitate air flow around the separate baked items comprising the baked goods once the baked goods are removed from the baking pan and placed on the upper surface to cool. But removal of baked goods from a baking pan to a cooling rack frequently results in damage to the baked goods (e.g., broken cookies, damaged cakes, muffins, etc.), which renders the baked goods unpalatable. Not only are the baked goods likely to break or crumble when handled to remove them from the conventional baking pan but placement of the hot baked goods on the surface of the cooling tray also is likely to result in breakage.

SUMMARY OF THE INVENTION

The present invention provides a baking device that overcomes the shortcomings of the known arts.

In one embodiment, the invention includes a baking device configured for both baking and cooling of baked goods. The baking device includes a rectangular baking pan formed as an open-top container from a single sheet of metal with substantially planar opposing baking and bottom pan surfaces, wherein sides extend substantially vertically from edges of the baking pan surface and wherein indentations or depressions formed in the baking pan surface positioned proximate four baking pan corners extend out as protrusions from the bottom baking pan surface and function as standoffs.

The baking device further includes a rectangular cooling rack formed as an open-top container from a single sheet of metal with substantially planar opposing baking and bottom rack surfaces, wherein sides extend substantially vertically from edges of the baking rack surface, wherein indentations or depressions formed in the baking rack surface proximate four cooling rack corners extend out as protrusions from the bottom cooling rack surface, which function as standoffs and wherein a plurality of small gauge holes are formed in the cooling rack between the baking rack and lower rack surfaces.

Dimensions of the cooling rack and baking pan are defined so that the cooling rack seats snugly in the baking pan and the bottom cooling rack surface contacts and presses against the baking pan surface in an assembled state, for transferring heat from the baking pan to the cooling rack.

In the baking device, a gauge of the sheet metal comprising the baking pan is higher than a gauge of the sheet metal comprising the cooling rack. Preferably, a gauge of the sheet metal comprising the baking pan is at least 12 and the gauge of the sheet metal comprising the cooling rack is 30 or less. Also, the protrusions or standoffs extending from the bottom cooling rack surface cause the cooling rack to stand off at least 0.25 inches and, the small gauge holes formed in the cooling rack surfaces are 0.05 inches and wherein the small gauge holes are approximately 0.26 inches apart. In addition, the small gauge holes formed in the cooling rack surfaces are 0.12 inches and wherein the small gauge holes are approximately 0.46 inches apart, in a diamond pattern.

Preferably, the cooling rack baking surface is treated to realize a non-stick of baking goods position on the cooling rack surfaces. Most preferably, the cooling rack baking surface is coated with silicone. Using a metal sheet realizes a substantially rigid cooling rack. For handling purposes, handles are formed to extend from at least two of the vertically extending sides of the cooling rack. Preferably, the handles extend from at least two of the vertically extending sides of the baking pan, and are treated or coated with a thermally resistant or insulating material.

In order to facilitate heat transfer between the pan and the rack while in an oven, the cooling rack is nested within a concavity formed between sides of the baking pan. Preferably, the baking pan and cooling racked are metal selected from the group consisting of black, carbon or stainless steel, aluminum, anodized aluminum, cast iron and titanium. The cooling rack and baking pan, however, may comprise different metals without deviating from the scope and spirit of the invention.

The invention also provides a method of cooking baked goods in a baking device as defined herein. The method includes assembling the baking device by inserting the cooling rack into the baking pan in an arrangement so that the bottom surface of the rack contact the baking surface of the pan, positioning material to be baked on the baking surface of the cooling rack, inserting the baking device into an oven for a time appropriate to cook the material to be baked and removing the baking device from the oven for cooling including separating the rack from the pan and positioning the rack on a cooling surface so that the rack is supported on said cooling surface by the rack standoffs.

The contact between the baking surface of the pan and the bottom surface of the rack minimizes an amount of baking material entering openings defined by the small gauge holes.

BRIEF DESCRIPTION OF THE DRAWINGS

Further features and advantages of the invention will become apparent from the description of embodiments that follows, with reference to the attached figures, wherein:

FIG. 2a depicts a top perspective view of a baking pan included as part of the rectangular baking device of FIG. 1;

FIG. 2b depicts a top plan view of the FIG. 2a baking pan;

FIG. 2c depicts a side plan view of the FIG. 2a baking pan, highlighting the length of the rectangular pan;

FIG. 2d depicts a side plan view of the FIG. 2a baking pan, highlighting the width of the rectangular pan;

DETAILED DESCRIPTION OF THE PREFERRED EMBODIMENTS

Figure 1:
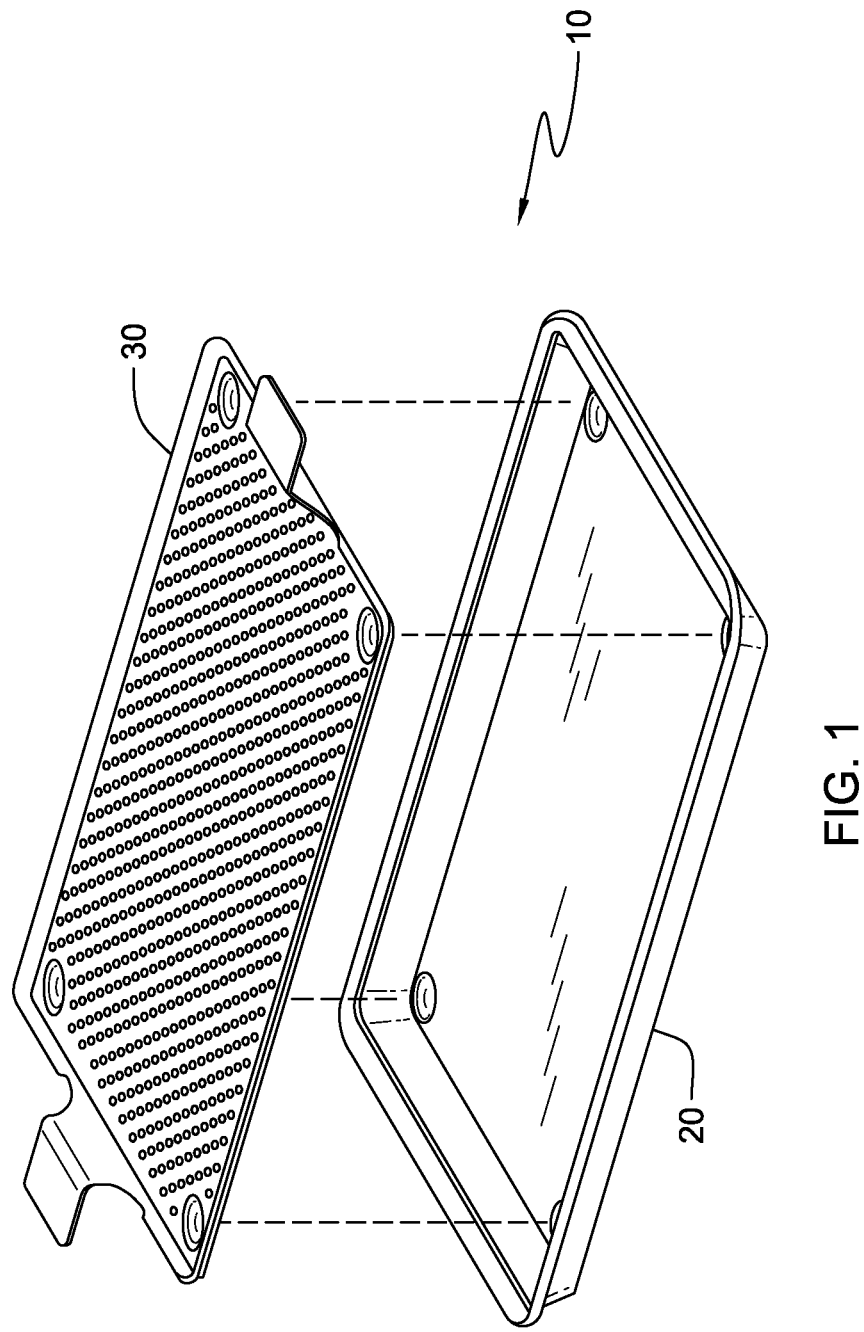
FIG. 1 depicts an embodiment of a rectangular baking device according to the invention, in an exploded view.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

FIGS. 1, 2a-d and 3a-d together depict an embodiment of a baking device 10 of the invention. The baking device 10 includes a baking pan or sheet 20 (hereinafter "baking pan") and a cooling rack 30. The cooling rack 30 is seated within the baking pan 20 (preferably) before positioning pre-baked goods directly on the cooling rack 30 and, placement of the entire device 10, i.e., the baking pan 20 with the cooling rack 30 and pre-baked foods seated therein into an oven (not shown) for cooking/baking. Please note that the pre-baked goods are not shown on the baking device 10 in FIGS. 1, 2a-d and 3a-d, for ease of explanation.

Please further note that while the baking pan 20 and cooling rack 30 are preferably formed of non-stick surfaces, the invention is not limited to baking devices that have surfaces formed to be non-stick.

The Baking Pan

The baking pan 20 of baking device 10 (FIGS. 2a-2d) is preferably formed from a single sheet of sheet-metal as a shallow, open-top container that is substantially rectangular having a length (Lo; FIG. 2c), a width (Wo; FIG. 2d) and a height dimension (Ho; FIG. 2c; Dos; FIG. 2d). The pan 20 so formed has a planar pan baking surface 202. The pan baking surface 202 has edges 204 (corresponding to the length dimension of the baking surface 202) and edges 206 (corresponding to the width dimension of the bottom surface 202). Sides 210 and sides 212 (corresponding to the length and width dimensions, respectively) extend vertically from the "length" edges 204 and "width" edges 206 of the baking surface 202, respectively.

The sides 210, 212 extend linearly and substantially vertically from a plane of the baking surface 202, forming an angle therewith of between 90° and 160° (for example, 135°). The length of the sides 210, 212 and the angle with respect to the plane of baking surface 202 define the vertical height of the baking pan 20 (i.e., Ho; FIG. 2c). Preferably, the upper boundaries of sides 212 (width dimension) are formed as handle-like (substantially) horizontally extending edges 216. The upper boundaries of sides 210 (length dimension) are preferably formed as lips 214 (as shown) or alternatively, formed as handle-like (substantially) horizontally extending edges (not shown in FIGS. 2a-d). Alternatively, the upper boundaries of sides 210, 212 may terminate as a slight bend or roll.

The baking pan 20 includes standoffs 220 in order that a bottom surface 222 of the pan 20, which opposes baking surface 202, does not entirely contact a surface upon which the baking device 10 (i.e., baking pan 20) is positioned, for example, when removed from an oven—the baking pan does not lay flat. The standoff's 220 are preferably formed by pressing the sheet metal material used to form the pan 20 from the baking surface 202 downwards, to protrude (220) from the bottom surface 222. The standoffs 220 are preferably (and advantageously) formed from the same single sheet used to form the pan. Accordingly, indentations 220' are formed in the baking surface 202 into which standoffs, formed in a lower surface of the cooling rack 30 (not shown in FIGS. 2a-d). The indentations 220' are positioned in order to maintain the cooling rack 30 stably in the baking pan during intended use (to be described in detail in cooperation with FIGS. 3a-d), so that a bottom or lower surface (322; see FIGS. 3a-3d) of cooling rack 30 is substantially always in contact with the baking surface 202 of pan 20.

Please note that the overall length (Lo) of the baking pan 20 is preferably in a range of 17 to 20 inches, including the full horizontal extent of handles 216. Preferably, the length (Lo) is 18.9 inches, as shown in FIG. 2c. The horizontal extent of the handles 216 is between 0.50 and 1.25 inches, for example, 0.90 inches. An important requirement of the length and width of the baking pan 20 is that the length and width accommodate the length and width of the cooling rack 30 in order that the cooling rack 30 seats snugly in the container-like baking pan 20, and in order that the pan bottom surface 222 contacts substantially the entire surface 302 of the cooling rack 30 (see below). The height (Ho) is preferably in a range of 0.7 to 1.2 inches, for example 1.0 inch as shown in FIG. 2c.

The standoff 220 is designed to standoff the lower surface 222 from 0.2 to 0.045 inches, for example, 0.33 inches, adding to an overall height of pan of 1.33 inches (Hos), as shown. The standoffs 220 are circular (but not limited thereto), with a radius that is between 0.35 to 0.75 inches, preferably 0.53 inches. Please note that the overall width (Wo) of the baking pan 20 is preferably in a range of 10 to 13 inches, for example, 11.90 inches, as shown in FIG. 2d. The distance between the centers of the standoffs 220 is 14.80 (Los) inches in the length dimension and 8.50 inches in the width dimension (Wos), as shown in FIG. 2b. For that matter, the length from the outer boundary of the standoffs 220, (Loss) is preferably 16.1 inch and the width from the outer boundary of the standoff's 220 (Woss) is preferably 8.5 inches.

Please note that the aforementioned figures and description are presented for exemplary purposes only; and, the dimensions may be modified without deviating from the scope and spirit of the invention.

The Cooling Rack

Figure 3A:
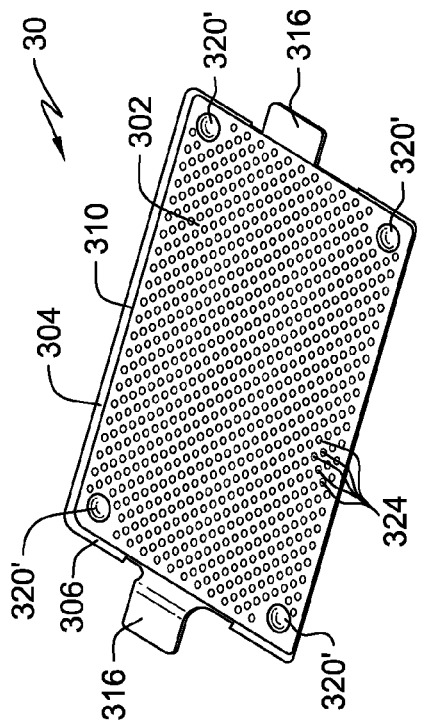
FIG. 3a depicts a top perspective view of a cooling rack included as part of the rectangular baking device of FIG. 1.
Figure 3C:
FIG. 3c depicts a side plan view of the FIG. 3a cooling rack, highlighting the length of the rectangular rack.
Figure 3D:
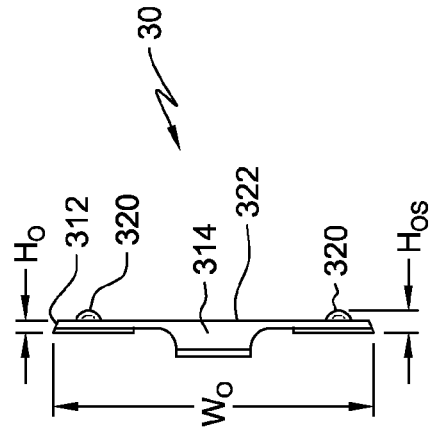
FIG. 3d depicts a side plan view of the FIG. 3a cooling rack, highlighting the width of the rectangular rack.
Figure 3B:
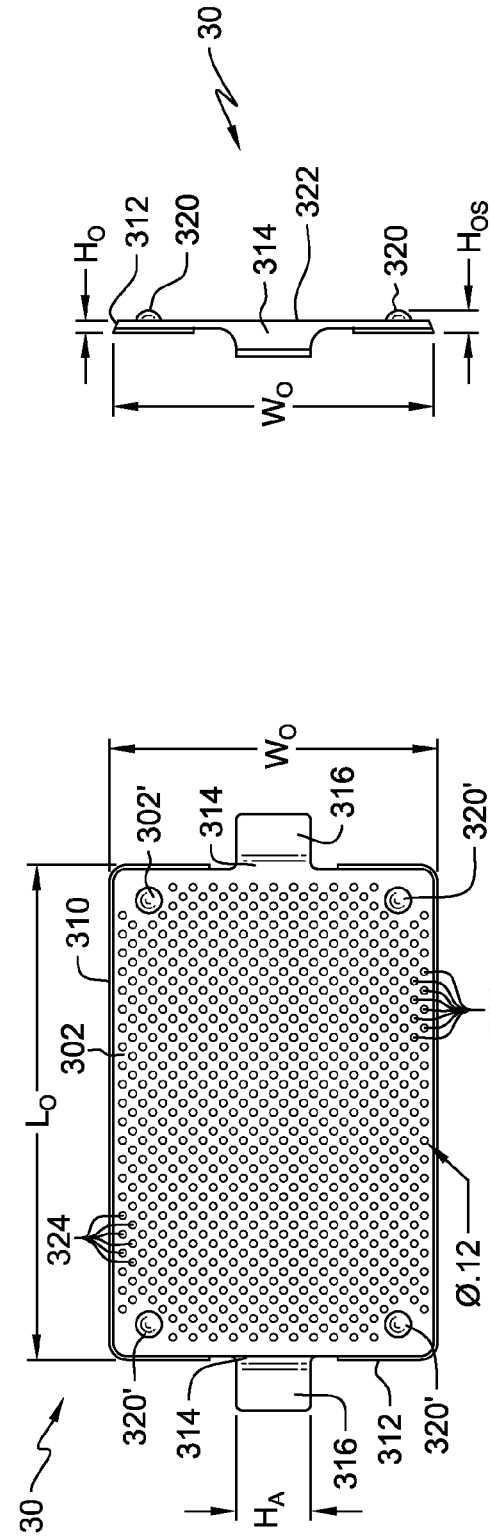
FIG. 3b depicts a top plan view of the FIG. 3a cooling rack.

The cooling rack 30 (or "rack") of baking device 10 (FIGS. 3a-3d) is preferably formed from a single metal sheet as a shallow, open-top container that is substantially rectangular having a length (Loh; FIG. 3c) a width (Wo; FIG. 3d) and a height dimension (HO; FIG. 3d). The rack 30 so formed has a planar baking surface 302. The rack baking surface 302 has edges 304 (corresponding to the length dimension of the planar rack baking surface 302) and edges 306 (corresponding to the width dimension of the planar rack baking surface 302), Sides 310 and sides 312 (corresponding to the length and width dimensions) extend from the "length" edges 304 and "width" edges 306 of the baking surface 302, respectively.

The sides 310, 312 extend linearly and substantially vertically from a plane of the baking surface 302, forming an angle therewith of between 90° and 160°, preferably 135°. The angle should be equivalent to or otherwise complement side angles of the corresponding baking pan 20 utilized in the combination baking device 10 of which the rack 30 is part, in order that when seated in the baking pan 20, the cooling rack bottom surface is in contact with substantially the entire baking surface 202 of the baking rack, to optimize heat transfer in an assembled state.

The length of the sides 314 and the angle define the vertical height of the cooling rack 30. The upper boundaries of sides 310 (length dimension) are formed as lips or in a slight bend or roll. Preferably, the upper boundaries of sides 312 (width dimension) include a further vertical dimension 314 from which extends as a handle formed as horizontally extending edges 316 (i.e., the handle comprises a vertical curved part as well as horizontal edge 316). The horizontally extending edges 316 are formed to be substantially parallel to a plane of the baking surface 302. Optionally, the upper boundaries of sides 310 (length dimension) also may be formed as handle-like (substantially) horizontally extending edges (not shown in FIGS. 3a-d). Alternatively, the upper boundaries of sides 312 or sides 314 may terminate as with a slight bend or roll.

The cooling rack 30 includes standoffs 320 in order that a lower or bottom surface 322 of the rack 30, which opposes baking surface 302, does not directly contact a surface upon which the baking device 10, or cooling rack 30, is positioned, particularly when removed from an oven. The standoffs 320 are preferably formed by pressing from the surface 302, so that they are formed from the same single sheet used to form the cooling rack 30. Accordingly, indentations 320' are formed in baking surface 302.

The standoffs 320 also are provided so that upon positioning of the cooling rack 30 within the baking pan 20, standoffs 320 are inserted and aligned within indentations 220' of baking pan 20 to maintain the cooling rack 30 stably in the baking pan during intended use (with continuous contact between lower surface 322 and baking surface 202). That is, the standoffs 320 are configured so that upon inserting the rack 30 in the baking pan 20, the lower or bottom surface 322 of rack 30 presses upon and controls substantially all of the baking surface 202 of the baking pan, to facilitate and optimize heat transfer from the pan 20 to the rack 30, and in particular, from the pan to any baking goods positioned on surface 302 of the rack 30. While it is preferred, it is not required that standoffs 320 snugly fit within indentations 222' but only that rack 30 is seated in pan 20 in such a way that facilitates heat transfer.

This arrangement is important in view of the fact that the cooling rack includes a plurality of though holes 324 (or small gauge openings that are preferably less than 0.10 inches) extending between surfaces 302 and 322 in order to allow air to pass and facilitate cooling of baked goods found thereon, once the cooling rack 30 is separated from the baking pan 20 and seated upon standoffs 320. The size of the holes and their arrangement affects cooling. The holes are between 0.04 and 0.2 inches in diameter if circular, for example, 0.12 inch. In an embodiment, the holes 0.12 inch holes are separated by 0.46 inch, and preferably arranged in a diamond patter. Please note, however, that the diameter of the holes, the spatial distance between holes and the pattern of holes may varied.

Contact of the respective cooling rack 30 and baking pan 20 surfaces when assembled for baking prevents pre-cooked goods placed on surface 302 from passing through the through holes 324, i.e., the surface 202 of pan 20 blocks the holes 324, while the cooling rack is positioned in the baking pan 20.

Please note that the overall length (Lo) of the cooling rack 30 (excluding the horizontal extent of handles 316) is preferably in a range of 16 to 18 inches, for example 16.9 inches (as shown in FIG. 3c). The overall length including the handles 316 (Loh) is between 19 and 22 inches, for example, 20.40 inches. The cooling rack 30 must be formed with length and width dimensions so that the bottom surface 322 is able to be positioned within the baking pan, complementing the length and width dimensions of the baking pan 20, so that substantially all corresponding pan and rack surfaces contact each other to effect a stable seating therein, particularly baking surface 202 of pan 20 and bottom surface 302 of rack 30.

The height of the cooling rack 30 (Ho) is preferably in a range of 0.0.20 to 0.50 inches without the handles 316 (for example, 0.30 inches), and in a range of 0.5 and 0.9 inches with the standoffs (Hos; for example, 0.7 inches), as shown in FIG. 3d. The standoffs 320 are designed to standoff the lower surface 322 from 0.2 to 0.045 inches (for example, 0.38 inches), as shown. The standoffs 320 are circular, with a radius that is in a range of 0.35 to 0.75 inches, preferably 0.50 inches. Please note that the overall width (Wo) of the cooling rack 30 is preferably in a range of 10 to 13 inches (for example, 10.7 inches), as shown in FIG. 3d. The height of the cooling rack 30, including the standoffs 320, side 312 and handles 314, 316, is in a range of 1.3 to 1.75 inches (for example, 1.45 inches), as shown in FIG. 3c. The standoffs 320 are designed to standoff from the lower surface 322 from 0.2 to 0.045 inches (for example, 0.38 inches).

The thickness of the sheet metal comprising the baking pan 20 is in a range of between 0.010-0.100 inches, for example, 0.2 inches. The thickness of the sheet metal comprising the cooling rack 30 is in a range of between 0.010-0.100 inches, for example, 0.1 inch. The ratio of the thickness of the baking pan 20 to the thickness of the cooling rack 20 in an alternative embodiment is in a range of 4 to 10, and preferably 5. The ratio is important to ensure that there is proper heat transfer from the baking pan to the cooling rack when their respective planar surfaces are in physical contact during baking and, that there is minimal mass to the cooling rack relative the mass of the baking pan, so that the cooling rack 30 holds minimal heat (in the much smaller mass) to minimize "cooking" post-separation.

Preferably, the surfaces of both the baking pan 20 and cooling rack 30 are coated with a thermally resistant material, for example, silicone or other heat resistant non-stick coatings able to withstand high oven temperatures. The overall dimensions of the baking pan 20 and cooling rack 30 together are between 9 inches by 17 inches (for example, 9×13 inches; 10×15 inches; or 11 by 17 inches).

Please note that the aforementioned figures and description are presented for exemplary purposes only; and, the dimensions may be modified without deviating from the scope and spirit of the invention, but are not limited thereto.

LIST OF REFERENCE SYMBOLS 10 baking device
20 baking pan
30 cooling rack
202 planar pan bottom surface of pan 20
204 edges of planar pan bottom surface of pan 20 (length)
206 edges of planar pan bottom surface of pan 20 (width)
210 sides extending or rising up from the edges 204
212 sides extending or rising up from the edges 206
214 lips
216 handles
220 standoffs 220
220' indentations
220 planar pan surface opposing surface 202
302 planar rack bottom surface 302
304 edges in rack bottom surface (length)
306 edges in rack bottom surface (width)
310 sides corresponding to the length
312 sides corresponding to the width
314 further vertical extension from upper end if sides 312
316 handles extending horizontally from upper ends of extension 314
320 standoffs 320
320' indentations 320'
322 planar rack surface opposing rack bottom surface 302
324 through holes 324 between surfaces 302 and 322

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A baking device configured for both baking and cooling of baked goods, comprising:
    a rectangular baking pan formed as an open-top container from a single sheet of metal with substantially planar opposing baking and bottom pan surfaces, wherein sides extend substantially vertically from edges of the baking pan surface and wherein indentations or depressions formed in the baking pan surface positioned proximate four baking pan corners extend out as protrusions from the bottom baking pan surface and function as standoffs; and
    a rectangular cooling rack formed as an open-top container from a single sheet of metal with substantially planar opposing baking and bottom rack surfaces, wherein sides extend substantially vertically from edges of the baking rack surface, wherein indentations or depressions formed in the baking rack surface proximate four cooling rack corners extend out as protrusions from the bottom cooling rack surface, which function as standoffs and wherein a plurality of small gauge holes are formed in the cooling rack between the baking rack and lower rack surfaces;
    wherein dimensions of the cooling rack and baking pan are defined so that the cooling rack seats snugly in the baking pan and the bottom cooling rack surface contacts and presses against the baking pan surface in an assembled state, for transferring heat from the baking pan to the cooling rack.

2. The baking device as set forth in claim 1, wherein the protrusions or standoffs extending from the bottom cooling rack surface cause the cooling rack to stand off at least 0.25 inches.

3. The baking device as set forth in claim 1, wherein the small gauge holes formed in the cooling rack surfaces are 0.05 inches in diameter and wherein the small gauge holes are approximately 0.26 inches apart.

4. The baking device as set forth in claim 1, wherein at least the cooling rack baking surface is treated to effect a non-stick of baking goods position on the cooling rack surfaces.

5. The baking device as set forth in claim 1, wherein the metal sheet realizes a substantially rigid cooling rack.

6. The baking device as set forth in claim 1, wherein handles extend from at least two of the vertically extending sides of the baking pan.

7. The baking device as set forth in claim 1, wherein the cooling rack is nested within a concavity formed between sides of the baking pan.

8. The baking device as set forth in claim 1, wherein the baking pan and cooling racked are metal selected from the group consisting of black, carbon or stainless steel, aluminum, anodized aluminum, cast iron and titanium.

9. The baking device as set forth in claim 1, wherein the small gauge holes formed in the cooling rack surfaces are 0.12 inches in diameter and wherein the small gauge holes are approximately 0.46 inches apart, in a diamond pattern.

10. The baking device as set forth in claim 9, wherein the cooling rack baking surface is coated with silicone.

11. The baking device as set forth in claim 1, wherein handles extend from at least two of the vertically extending sides of the cooling rack.

12. The baking device as set forth in claim 11, wherein the handles are treated or coated with a thermally resistant or insulating material.

13. The baking device as set forth in claim 1, wherein a thickness gauge of the sheet metal comprising the baking pan is higher than a thickness gauge of the sheet metal comprising the cooling rack.

14. The baking device as set forth in claim 13, wherein the gauge size of the sheet metal comprising the baking pan is at least 12 and the gauge size of the sheet metal comprising the cooling rack is 30 or less.

* * * * *